July 18, 1933. J. S. REID 1,918,666
GLASS RUN CHANNEL
Filed March 21, 1931 2 Sheets-Sheet 1

INVENTOR
James S. Reid
BY
Brockett, Hyde, Higley + Moye
ATTORNEYS

July 18, 1933.  J. S. REID  1,918,666
GLASS RUN CHANNEL
Filed March 21, 1931  2 Sheets-Sheet 2

INVENTOR
James S. Reid

BY
Brockett, Hyde, Higley & Mayer
ATTORNEYS

Patented July 18, 1933

1,918,666

UNITED STATES PATENT OFFICE

JAMES S. REID, OF SHAKER HEIGHTS, OHIO, ASSIGNOR TO THE REID PRODUCTS COMPANY, OF CLEVELAND, OHIO, A CORPORATION OF OHIO

GLASS RUN CHANNEL

Application filed March 21, 1931. Serial No. 524,316.

The invention disclosed in this application is for glass run channel structures, such as are used in the automotive industry.

More particularly, the present invention relates to a glass run channel having a generally channel-shaped resilient metal core, said core having a base and a pair of side walls provided at their outer edges with longitudinally disposed beads in which are suitable re-enforcing means, such as wire or the like. In one embodiment of the invention, said core is in the form of transversely disposed, longitudinally spaced resilient metal straps which are held or maintained in such spaced relation by the bead re-enforcing means thereof. In another embodiment of the invention, the channel core is a one-piece resilient sheet metal member having transversely disposed slots and continuous or uninterrupted outer side edge portions terminating in beads containing such re-enforcing means. In still another embodiment of the invention, the channel core is in the form of a resilient metal tape or ribbon wrapped back and forth spirally or otherwise, in either spaced or close formation, about such bead re-enforcing means.

In all embodiments, the channel core is provided with suitable glass-engaging padding or cushioning means, such as vulcanized rubber and felt, which padding or cushioning means may, if desired, entirely encase or enclose the channel core, as will hereinafter more fully appear.

The bead re-enforcing means of the several embodiments of the present invention not only effect the provision of core beads of stronger and more rigid character, which enable glass run channels embodying the present invention to have the desired flexibility and yet hold their general channel shape, but also, said bead re-enforcing means materially assist in the formation of the several forms of channel cores here illustrated, all as will be readily understood. Furthermore, in one embodiment of the invention, said bead re-enforcing means hold in proper spaced relation the transverse metal straps which make up the main body portion of the channel core, all as will hereinafter more fully appear.

Further features of the present invention are in part obvious and in part will appear more in detail hereinafter.

The invention is fully set forth in the following description, drawings and claims.

Figure 1:
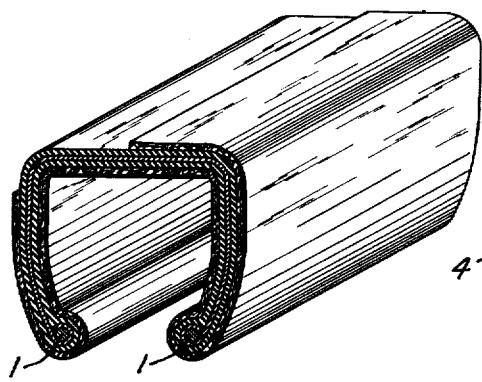
Figure 2:
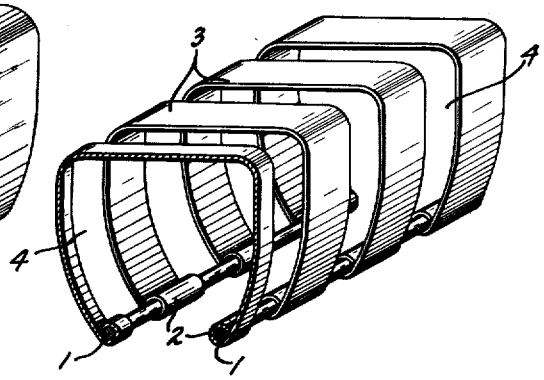
Figure 3:
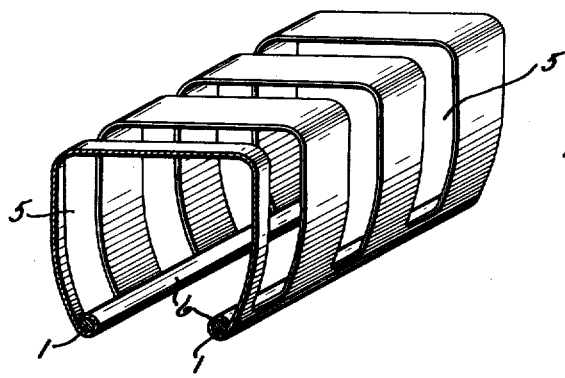
Figure 4:
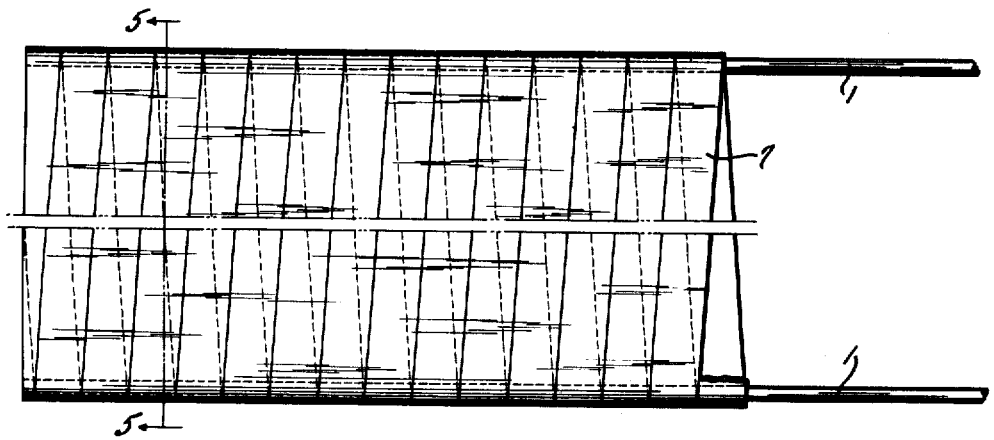
Figure 5:
Figure 6:
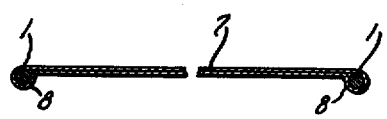
Figure 7:
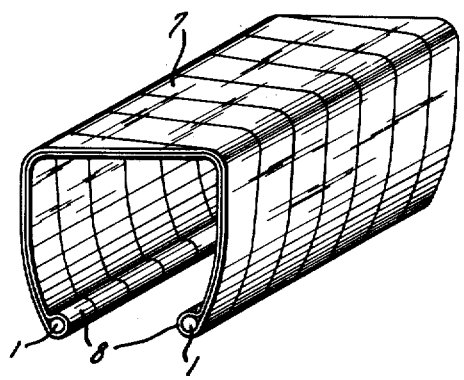

In the drawings, Fig. 1 is a perspective view of a portion of a finished channel constructed according to one embodiment of the present invention; Fig. 2 is a perspective view of a portion of a channel core having longitudinally spaced core straps connected by re-enforcing bead means; Fig. 3 is a perspective view of a channel core having core straps formed from a single piece of metal also having re-enforcing bead means; Fig. 4 is a plan view showing the method of making another form of channel core having re-enforcing bead means; Fig. 5 is a cross section upon the line 5—5 of Fig. 4; Fig. 6 is a view similar to Fig. 5 but showing this form of channel core in a more completed state; and Fig. 7 is a perspective view of the channel core of Figs. 4, 5 and 6 bent into channel shape and ready for the covering of cushioning material, such as shown in Fig. 1.

In the several embodiments of the invention here shown, 1 represents the two bead re-enforcing means which are preferably of wire or the like. Engaging these cores are sleeves 2 formed on the ends of transverse straps 3, here shown as flat strips of resilient sheet metal. In the arrangement shown in Fig. 2, these transverse metal straps 3 are longitudinally spaced to provide transverse slots or openings, generally indicated at 4. The straps 3 may have their beads 2 secured to the bead re-enforcing means 1 while said straps are in flat arrangement, as shown in connection with another embodiment of the invention, as in Fig. 4, after which said straps are bent into channel or U-shaped formation, as shown in Fig. 2, or the straps may be bent into U-shape or channel shape formation and then the beaded ends of the straps sleeved about the bead re-enforcing means 1, all as will be readily understood.

In the arrangement shown in Fig. 3, the main body portion of the channel core is a one-piece spring metal strip having transversely disposed slots 5 and continuous or uninterrupted side edge portions 6, which edge portions are beaded or rolled about the bead re-enforcing means 1.

In the arrangement shown in Fig. 4, a spring metal tape or ribbon 7 is wrapped in close spiral formation about the bead re-enforcing means 1, as shown in Fig. 5, and said tape or ribbon is then formed in so that the two opposite layers or stretches thereof nest against each other and the bead re-enforcing means 1 are encased in bead or sleeve portions 8 formed about them. This generally flat structure with its re-enforced beads, as shown in Fig. 6, is then formed into channel shape, as shown in Fig. 7, after which it is provided, as are also the channel cores of Figs. 2 and 3, with suitable glass-engaging padding or cushioning material, of vulcanized rubber and felt, such as shown in Fig. 1, for example.

In any of these constructions, while the completed channel in the straight possesses sufficient rigidity to hold it in shape in straight runs, it nevertheless has ample flexibility to enable it to be readily bent to conform to various shapes of window corners, all as will be readily understood.

Having described my invention, I claim:

1. A glass run channel, comprising a generally channel-shaped resilient metal structure having a base and a pair of side walls, said base and said side walls being provided with transversely disposed slits and said side walls terminating at their outer edges in generally tubular glass-engaging bead means, a re-enforcing wire in the bead means of each of said side walls, and cushioning means for each of said glass-engaging bead means.

2. A glass run channel, comprising a one-piece, generally channel-shaped sheet metal member having a base and a pair of side walls terminating at their outer edges in glass-engaging re-enforcing beads, said member being provided throughout substantially its entire length with generally transversely disposed slots each extending from a point within one side wall through said base to a point within the other side wall, whereby said member possesses considerable flexibility, a re-enforcing wire in each of said beads, and cushioning means for said glass-engaging beads.

3. A glass run channel, comprising a one-piece, generally channel-shaped sheet metal member having a base and a pair of side walls terminating at their outer edges in glass-engaging re-enforcing beads, said member being provided throughout substantially its entire length with generally transversely disposed slots each extending from a point adjacent the bead of one side wall through said base to a point adjacent the bead of the other side wall, whereby said member possesses considerable flexibility, a re-enforcing wire in each of said beads, and cushioning means for said glass-engaging beads.

4. A glass run channel, comprising a generally channel-shaped glass-receiving structure made up of a series of transversely extending, longitudinally spaced resilient metal straps each having a base and a pair of side walls terminating at their outer edges in generally tubular, glass-engaging beads, a re-enforcing wire extending through the beads of each of said side walls and serving to maintain said straps in such longitudinally spaced relation, and cushioning means for at least the beads and the connecting wires of said strap side walls.

5. A glass run channel, comprising a generally channel-shaped glass-receiving structure having a base and a pair of side walls, re-enforcing means at the outer edge of each of said side walls, said base and said side walls being made up of a strip of resilient metal wrapped transversely back and forth about said re-enforcing means, and glass-engaging cushioning means for the outer edges of the side walls of said glass-receiving structure.

6. A glass run channel, comprising a generally channel-shaped glass-receiving structure having a base and a pair of side walls, re-enforcing means at the outer edge of each of said side walls, said base and said side walls being made up of a strip of resilient metal wrapped spirally back and forth about said re-enforcing means, and glass-engaging cushioning means for the outer edges of the side walls of said glass-receiving structure.

7. A glass run channel, comprising a generally channel-shaped glass-receiving structure having a base and a pair of side walls, re-enforcing means at the outer edge of each of said side walls, said base and said side walls being made up of a strip of resilient metal wrapped transversely back and forth in close formation about said re-enforcing means, and glass-engaging cushioning means for the outer edges of the side walls of said glass-receiving structure.

8. A glass run channel, comprising a generally channel-shaped glass-receiving structure having a base and a pair of side walls, re-enforcing means at the outer edge of each of said side walls, said base and said side walls being made up of a strip of resilient metal wrapped transversely back and forth about said re-enforcing means, the inner and outer metal strip portions between said re-enforcing means lying for the most part in engagement with each other, and glass-engaging cushioning means for the outer edges of the side walls of said glass-receiving structure.

9. A glass run channel, comprising a generally channel-shaped glass-receiving structure having a base and a pair of side walls, re-enforcing means at the outer edge of each of said side walls, said base and said side walls being made up of a strip of resilient metal wrapped transversely back and forth about said re-enforcing means, the major portions of said re-enforcing means lying to the inside of the general planes of the side walls of said glass-receiving channel shaped structure, and glass-engaging cushioning means for the outer edges of the side walls of said glass-receiving structure.

JAMES S. REID.

CERTIFICATE OF CORRECTION.

Patent No. 1,918,666.   July 18, 1933.

JAMES S. REID.

It is hereby certified that error appears in the printed specification of the above numbered patent requiring correction as follows: Page 1, line 82, strike out the word "cores" and insert instead "re-enforcing means in the embodiment of the invention shown in Fig. 2,"; and in same line, after the word "are" insert "tubular beads or"; and that the said Letters Patent should be read with these corrections there in that the same may conform to the record of the case in the Patent Office.

Signed and sealed this 19th day of September, A. D. 1933.

(Seal)
         M. J. Moore.
         Acting Commissioner of Patents.

9. A glass run channel, comprising a generally channel-shaped glass-receiving structure having a base and a pair of side walls, re-enforcing means at the outer edge of each of said side walls, said base and said side walls being made up of a strip of resilient metal wrapped transversely back and forth about said re-enforcing means, the major portions of said re-enforcing means lying to the inside of the general planes of the side walls of said glass-receiving channel shaped structure, and glass-engaging cushioning means for the outer edges of the side walls of said glass-receiving structure.

JAMES S. REID.

CERTIFICATE OF CORRECTION.

Patent No. 1,918,666.     July 18, 1933.

JAMES S. REID.

It is hereby certified that error appears in the printed specification of the above numbered patent requiring correction as follows: Page 1, line 82, strike out the word "cores" and insert instead "re-enforcing means in the embodiment of the invention shown in Fig. 2,"; and in same line, after the word "are" insert "tubular beads or"; and that the said Letters Patent should be read with these corrections there in that the same may conform to the record of the case in the Patent Office.

Signed and sealed this 19th day of September, A. D. 1933.

M. J. Moore.
Acting Commissioner of Patents.

(Seal)

CERTIFICATE OF CORRECTION.

Patent No. 1,918,666. July 18, 1933.

JAMES S. REID.

It is hereby certified that error appears in the printed specification of the above numbered patent requiring correction as follows: Page 1, line 82, strike out the word "cores" and insert instead "re-enforcing means in the embodiment of the invention shown in Fig. 2,"; and in same line, after the word "are" insert "tubular beads or"; and that the said Letters Patent should be read with these corrections there in that the same may conform to the record of the case in the Patent Office.

Signed and sealed this 19th day of September, A. D. 1933.

M. J. Moore.
Acting Commissioner of Patents.

(Seal)